(12) United States Patent
Xue et al.

(10) Patent No.: US 9,344,764 B1
(45) Date of Patent: *May 17, 2016

(54) FACILITATING COMMUNICATION ACTIONS IN ACCORDANCE WITH CABLE ATTRIBUTES

(71) Applicant: Sprint Communications Company L.P., Overland Park, KS (US)

(72) Inventors: Wen Xue, Overland Park, KS (US); Jay Douglas Cole, Overland Park, KS (US); Talat Jamshidi, Leawood, KS (US); Sharon Lynn Woodrum, Louisburg, KS (US); Philip Martin Kunkel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,390

(22) Filed: Feb. 11, 2015

Related U.S. Application Data (63) Continuation of application No. 13/033,323, filed on Feb. 23, 2011, now Pat. No. 9,021,527.

(51) Int. Cl.
| | |
|---|---|
| *H04N 21/41* | (2011.01) |
| *H04N 5/445* | (2011.01) |
| *H04N 21/478* | (2011.01) |
| *H04N 21/45* | (2011.01) |
| *H04N 21/4786* | (2011.01) |

(Continued)

(52) U.S. Cl.
CPC ......... *H04N 21/478* (2013.01); *H04N 21/4532* (2013.01); *H04N 21/4622* (2013.01); *H04N 21/4786* (2013.01); *H04N 21/4788* (2013.01); *H04N 21/6118* (2013.01); *H04N 21/6125* (2013.01); *H04N 21/6131* (2013.01); *H04N 21/6137* (2013.01); *H04N 21/6168* (2013.01); *H04N 21/6175* (2013.01); *H04N 21/6181* (2013.01); *H04N 21/6187* (2013.01)

(58) Field of Classification Search
CPC .............................. H04N 5/445; H04N 21/41
USPC ......................................... 725/40, 46, 48, 59
See application file for complete search history.

(56) References Cited

U.S. PATENT DOCUMENTS

| | | |
|---|---|---|
| 8,379,528 B1 | 2/2013 | Xue et al. |
| 8,555,315 B2 | 10/2013 | Woods et al. |

(Continued)

OTHER PUBLICATIONS

Final Office Action dated Apr. 23, 2014 in U.S. Appl. No. 13/033,323, 9 pages.

(Continued)

*Primary Examiner* — Kieu Oanh T Bui (57) ABSTRACT

Systems, methods, and computer-readable media for facilitating initiation of communication actions in accordance with cable attributes. In one embodiment, cable attributes are referenced that indicate utilization of a cable device at a time a communication event is directed to a user device. The user device and the cable device may be associated with the same user. Communication actions to apply in accordance with the communication event are determined based on at least one of the cable attributes. Thereafter, the communication actions are initiated, for example, such that a user is provided with an indication of the communication event visually via the cable device and/or audibly via the user device, depending on the particular cable attributes.

18 Claims, 4 Drawing Sheets

(51) Int. Cl.
*H04N 21/4788* (2011.01)
*H04N 21/61* (2011.01)
*H04N 21/462* (2011.01)

(56) References Cited

U.S. PATENT DOCUMENTS 8,718,596 B1 5/2014 Xue et al.
8,745,661 B2 6/2014 Ellis et al.
2014/0098790 A1 4/2014 Xue et al.

OTHER PUBLICATIONS

Non-Final Office Action dated Jul. 30, 2014 in U.S. Appl. No. 13/033,323, 11 pages.
Non-Final Office Action dated Nov. 6, 2013 in U.S. Appl. No. 13/033,323, 8 pages.
Notice of Allowance dated Dec. 18, 2014 in U.S. Appl. No. 13/033,323, 9 pages.

FACILITATING COMMUNICATION ACTIONS IN ACCORDANCE WITH CABLE ATTRIBUTES

CROSS-REFERENCE TO RELATED APPLICATIONS

This application is a continuation of U.S. patent application Ser. No. 13/033,323, filed on Feb. 23, 2011 and titled "FACILITATING COMMUNICATION ACTIONS IN ACCORDANCE WITH CABLE ATTRIBUTES", the disclosure of which is incorporated by reference herein in its entirety.

SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, facilitating communications to apply according to cable attributes identified in connection with operation of a cable device. In this regard, when a communication event (e.g., an incoming voice call, an incoming text message, etc.) associated with a user device occurs while a corresponding cable device is being utilized, for example, to provide television programming, notification of the communication event to the user may depend on the particular utilization of the cable device at the time of the communication event. For example, a phone may ring or be prevented from ringing while a user is viewing a particular television program. Additionally or alternatively, a display screen corresponding with the cable device may present or prevent a visual indication of the communication event when the user is viewing the particular television program. In some cases, the television programming can be monitored such that, upon a change of the presented programming, the user can be provided with a notification of the past communication event and/or provided with an option to return the communication event.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
DVD Digital Versatile Discs
EEPROM Electrically Erasable Programmable Read Only Memory
GPRS General Packet Radio Service
GSM Global System for Mobile Communications
iDEN Integrated Digital Enhanced Network
MDN Mobile Device Number
NAI Network Address Identifier
PC Personal Computer
PCS Personal Communications Service
PDA Personal Digital Assistant
PMP Portable Media Player
PSTN Public Switching Telephone Network
RAM Random Access Memory
ROM Read Only Memory
SMS Short Message Service
TDMA Time Division Multiple Access
UMTS Universal Mobile Telecommunications System
WiMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for facilitating communication actions in accordance with cable attributes. In this regard, communication actions are initiated and/or performed based on cable attributes associated with utilization of a cable device. A communication action, as used herein, refers to an action performed (or withheld or blocked from being performed) in association with a communication event directed to a user device. Such a communication event may be an incoming voice call (i.e., a telephone call), an incoming text message (e.g., a SMS message), or other incoming communication to a user device (e.g., an email, a social network posting, an instant message, etc.). By way of example, a communication action may be presenting an audio indicator of a communication event (e.g., providing a phone ring on a user device), withholding an audio indicator of a communication event (e.g., a blocking or preventing a phone ring on a user device), presenting a modified-audio indicator (e.g., providing a modified phone ring, for example, applying a vibration rather than a ring tone), presenting a visual indicator of a communication event (e.g., providing a display message on a television display screen), withholding a presentation of a visual indicator of a communication event (e.g., blocking or preventing a display message on a television display screen), presenting a modified-visual indicator (e.g., providing a modified display message, for example, displaying a smaller version of the display message on a television display screen), monitoring cable device usage (e.g., monitoring a position within a presented program, monitoring the program being presented, monitoring the type of program being presented, etc.).

A cable attribute, as used herein, refers to any attribute related to utilization of a cable device. Utilization of a cable device or cable device usage can be any functionality being performed by a cable device, such as a set-top box, a cable box, a video game console, etc. For instance, cable device usage may refer to programming (e.g., cable programming or television programming) provided by a cable device. In this regard, a cable attribute may be a program identifier identifying a program being presented via the cable device, a network identifier identifying a network associated with the program being presented via the cable device, a program-type identifier identifying a type of program being presented via the cable device (e.g., a sport program, a live program, a rerun program, a movie program, etc.), a source identifier identifying a source user or source device initiating the communication to the user device during usage of the cable device, a time identifier identifying a time a communication event to a user device occurs during usage of the cable device, or the like.

By way of example only, assume a user viewing a particular program via a cable device prefers not be disrupted while viewing the program. Further assume that an incoming call is directed to the user's mobile device. In such a case, the mobile device may not ring and/or a display message indicating an incoming call may not be presented on a display screen associated with the cable device during presentation of the program. During a commercial of the particular program or upon a user selecting to view another program, however, such an incoming call may be audio or visually relayed to the user and/or an option to return the phone call may be provided to the user.

Accordingly, in one aspect, the present invention is directed to one or more computer-readable media having computer-useable instructions embodied thereon for facilitating communication actions in accordance with cable attributes. The method includes referencing cable attributes that indicate utilization of a cable device at a time a communication event is directed to a user device associated with the cable device. Communication actions to apply in accordance with the communication event are determined based on at least one of the cable attributes. The communications actions are then initiated.

In another aspect, the present invention is directed to one or more computer-readable media having computer-useable instructions embodied thereon for facilitating initiation of call actions in accordance with cable events. The method includes receiving an indication of an incoming voice call directed to a mobile device of a user. A cable attribute is identified that provides an indication of a television program being presented to a user via a cable device associated with the user. Communication actions to initiate are determined based on the cable attribute that provides the indication of the television program being presented to the user. The communication action comprises presenting or preventing a presentation of a visual indicator of the incoming voice call displayed via a television monitor of the user, presenting or preventing a presentation of an audio indicator of the incoming voice call presented via the mobile device of the user, or a monitoring of the television program being presented to the user. The communication actions are initiated.

In yet another aspect, the present invention one or more computer-readable media having computer-useable instructions embodied thereon for performing a method for facilitating communication actions in accordance with cable attributes. The method includes monitoring presentation of programs provided via a cable device in response to a communication event. The communication event comprises an incoming voice call or an incoming text message to a user device associated with the cable device. A cable attribute is identified that corresponds with a communication action. The cable attribute indicates utilization of a cable device at a monitoring time. The communication action is initiated via the cable device.

Figure 1:
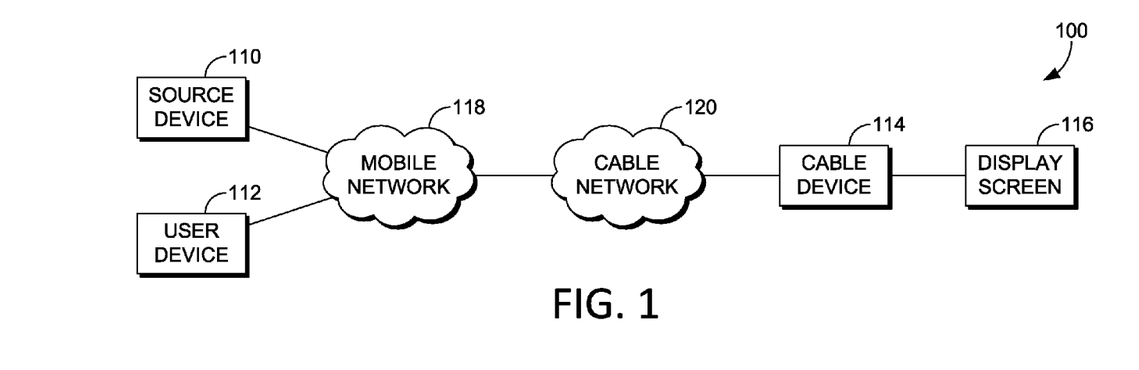
FIG. 1 is a block diagram of an exemplary network system that is suitable for operation of an embodiment of the present invention.

Referring to the drawings generally, and initially to FIG. 1 in particular, an exemplary networking system 100 for practicing an embodiment of the present invention is provided. It will be understood and appreciated by those of ordinary skill in the art that the networking system 100 shown in FIG. 1 is merely an example of one suitable computing system and is not intended to suggest any limitation as to the scope of use or functionality of the present invention. Neither should the networking system 100 be interpreted as having any dependency or requirement related to any single component or combination of components illustrated therein. The single unit depictions are meant for clarity, not to limit the scope of embodiments in any form.

As shown in FIG. 1, an exemplary networking system 100 includes a source device 110, a user device 112, a cable device 114, and a display screen 116. Source device 110, user device 112, and cable device 114 are capable of communicating via a communications network(s), such as mobile network 118 and/or cable network 120. Mobile network 118 might be a single network or multiple networks, as well as being a network of network. In embodiments, mobile network 118 is a wireless network (e.g., a wireless telecommunications network). A wireless telecommunications network refers to any type of telecommunications network that is wireless. Examples of a wireless telecommunications technologies that are compatible with mobile networks 118 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). In one embodiment, mobile network 118 comprises a wireless telecommunications network provided by a telecommunications network provider, such as, for example, Sprint®, AT&T®, etc. Mobile network 118 may include an array of devices, which are not shown so as to not obscure more relevant aspects of the invention. Components such as a base station, a communications tower, a media gateway controller, or even access points (as well as other components) can provide wireless connectivity in some embodiments.

As illustrated in FIG. 1, mobile network 118 can communicate with cable network 120, for example, using OIP protocols. The cable network refers to a network provided by a cable provider, such as, for example, Time Warner Cable®, Comcast, etc. Cable networks provide television capabilities, among other things, to consumers and facilitate the transmission of sending, propagating and receiving analogue or digital information signals.

Although FIG. 1 illustrates the mobile network 118 in communication with the cable network 120, communications networks 118 and 120 may be combined into a single network or can include multiple networks, as well as being a network of networks, but is shown in more simple form so as to not obscure other aspects of the present invention. In this regard, although FIG. 1 illustrates source device 110 and user device 112 communicating with the cable device 114 via mobile network 118 and cable network 120, a single network (e.g., a cable network) can be used. For instance, the source device 110 and the user device 112 might be in communication with one another via the cable network 120. Although single components are illustrated for clarity, networks 118 and/or 120 can enable communication between multiple devices (e.g., mobile devices, cable devices, etc.).

The source device 110 is any device that can be used to communicate with other devices. As used herein, the phrase "source device" refers to any electronic device capable of communicating with other devices, for example, using voice calls, text messages, etc. As such, source device 110 may take on a variety of forms, such as a personal computer (PC), a laptop computer, a mobile phone, a personal digital assistant (PDA), a portable media player (PMP), or any other device that is capable of communicating with other devices as described herein. Makers of illustrative devices include, for example, Research in Motion, Creative Technologies Corp., Samsung, Apple Computer, and the like. A source device can include, for example, a display(s), a power source(s) (e.g., a battery), a data store(s), a speaker(s), memory, a buffer(s), and the like. In embodiments, a source device is a wireless or mobile source device with which a wireless telecommunications network is utilized for communication. In other embodiments, a source device comprises a mobile or stationary source device (e.g., a landline telephone) with which another network, such as a cable network or public switching telephone network (PSTN) can be utilized for communication.

The source device 110 initiates a communication directed to the user device 112. Such a communication may be a voice call, a text message, etc. In this regard, the source device 110 can initiate a communication by requesting that a voice call be placed or a text message be delivered to the user device 112.

The mobile network 118 receives an indication of a communication event from the source device 110 intended for the user device 112. In some embodiments, the mobile network 118 utilizes a public switching telephone network (PSTN) to receive an indication of a communication incoming from a source device. In this regard, a mobile home network can receive an indication of a communication by way of a PSTN (not shown).

In embodiments of the present invention, the mobile network 118 provides an indication of a communication event (e.g., an incoming voice call) to the cable network 120. The mobile network 118 can communicate with the cable network 120, for example, using OIP protocol. Upon receiving an indication of a communication event, various components of the cable network 120 can be used to identify and initiate appropriate communication actions to apply, as described more fully with reference to FIG. 2.

To initiate various communication actions, the cable network 120 may communicate with, among others, the mobile network 118, the cable device 114, the user device 112, and/or the source device 110. For instance, in cases that an audio indicator is to be provided to a user via the user device 112, the cable network 120 may provide such an indication to the mobile network 118 to facilitate the audio indication via the user device 112. By way of further example, in cases that a visual indicator is to be provided to a user via the display screen 116, the cable network 120 may provide such an indication to the cable device 114 to facilitate the visual indication via the display screen 116.

The cable device 114 can be any cable device 114 that provides services to a user via a cable network. In this regard, the cable device 114 can provide programming services (e.g., television programming services) to a user via the cable network. The cable device 114 may be, for example, a set-top box, a cable box, a video game console, a television, or the like. Such services can be provided to the user by way of the display screen 116. For example, the display screen 114 can display televisions programs distributed via the cable network 120 and cable device 114. The display screen 116 can be any device that can provide a visual presentation to a user, such as, for example, a television, a monitor, or the like. In embodiments, the user of the user device 112 and the user of the cable device 114 is the same user. In this regard, a user of the mobile device is also associated with (e.g., a subscriber of) the cable device 114, or services provided in association therewith. For example, the cable device 114 is configured such that it is tied to or corresponds with the user device 112 (e.g., via a user device identifier such as a mobile number).

The cable device 114 is capable of facilitating implementation of communication actions, such as visual indicators. As such, the cable device 114 may receive an indication to provide a user with a visual indicator of an incoming phone call or an incoming text message. In such a case, the cable device 114 can facilitate display of such a visual indicator via the display screen 116, for example, such that the display screen 116 displays an indication of an incoming voice call (e.g., source identifier), a representation of an incoming text message, or the like. Although the cable device 114 and the display screen 116 are illustrated as two separate components, one skilled in the art will appreciate that the cable device 114 and the display screen 116 may be combined into a single component, for example, a television having such capabilities.

The user device 112 is any device of the user that can be used to communicate with other devices. The user device 112 is a device to which an incoming communication from the source device 110 is directed. As used herein, the phrase "user device" refers to any electronic device capable of communicating with other devices, for example, using voice calls, text messages, etc. As such, user device 112 may take on a variety of forms, such as a personal computer (PC), a laptop computer, a mobile phone, a personal digital assistant (PDA), a portable media player (PMP), or any other device that is capable of communicating with other devices as described herein. Makers of illustrative devices include, for example, Research in Motion, Creative Technologies Corp., Samsung, Apple Computer, and the like. A user device can include, for example, a display(s), a power source(s) (e.g., a battery), a data store(s), a speaker(s), memory, a buffer(s), and the like. In embodiments, a user device is a wireless or mobile user device with which a wireless telecommunications network is utilized for communication. In other embodiments, a user device comprises a mobile or stationary source device (e.g., a landline telephone) with which another network, such as a cable network or PSTN is utilized for communication.

By way of example with continued reference to FIG. 1, in implementation, assume that a communication event, such as a voice call or a text message, is initiated by the source device 110 and directed to the user device 112. Such a user device 112 is associated with the cable device 114. For instance, both the user device 112 and the cable device 114 may be subscribed to the same user, utilized by the same user, etc. An indication of the communication event is provided to the mobile network 118 (e.g., via a PSTN), which relays an indication of the communication event to the cable network 120. Assume that at the time of the communication event, the cable device 114 is presenting a television program, such as a football game. Components of the cable network are used to determine communication actions to apply in response to the incoming communication event based on user preferences and cable attributes associated with the presentation of the television program. Such communication actions may be, for example, providing or preventing an audio indicator and/or a visual indicator. To provide or prevent an audio indicator, the cable network 120 may communicate with the mobile network 118 and/or the user device 112 to implement such an audio indication or prevention thereof. To provide or prevent a visual indicator, the cable network 120 may communicate with the cable device 114 to implement such a visual indicator, or prevention thereof, for example, via the display screen 116.

Figure 2:
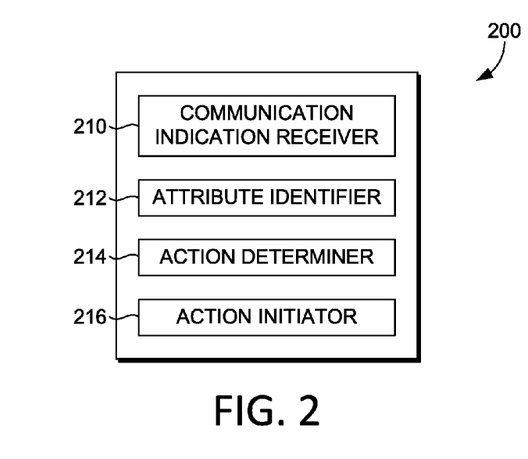
FIG. 2 is a block diagram of an exemplary computing system suitable for operation of an embodiment of the present invention.

With reference to FIG. 2, FIG. 2 illustrates an exemplary computing system 200 for facilitating communication actions in accordance with cable attributes, according to embodiments of the present invention. As shown in FIG. 2, an exemplary computing system 200 includes a communication indication receiver 210, an attribute identifier 212, an action determiner 214, and an action initiator 216. It will be understood by those of ordinary skill in the art that the components illustrated in FIG. 2 are exemplary in nature and in number and should not be construed as limiting. Any number of components may be employed to achieve the desired functionality within the scope of the embodiments hereof. Further, components may be located on any number of servers or computing devices.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As can be appreciated, computing system 200, or a portion thereof, may be implemented, for example, in connection with a mobile network, such as mobile network 118 of FIG. 1, and/or a cable network, such as cable network 120 of FIG. 1. Although computing system 200 is generally discussed herein in reference to a cable network (e.g., cable network 120 of FIG. 1), as can be appreciated, in some embodiments, any number of components can be utilized in association with the mobile network 118 or another network or device (e.g., cable device 114, user device 112). For example, components residing within a mobile network may receive an indication of a communication event, reference a user profile, identify cable attributes (e.g., by providing a request or a query to a cable network or cable device regarding cable events), determine communications actions, and initiate such communication actions.

The communication indication receiver 210 is configured to receive communication indications. A communication indication, as used herein, refers to an indication that a communication event is being initiated by a source device to a user device. A communication indication may include, for example, a source identifier identifying the source device, a user identifier identifying the user device, a message (e.g., a text message), etc. A source identifier may be any identifier that uniquely identifies a source device of a communication event. A user identifier may be any identifier that uniquely identifies a user device to which a communication event is directed. For instance, a source identifier and/or a user identifier may be a user name to which the user device is registered, an IP address of the user device, a mobile device number (MDN), a network address identifier (NAI), an email address, a telephone number mapping protocol (e.g., ENUM), etc. In some embodiments, a communication indication is received by way of a mobile network, such as mobile network 118 of FIG. 1. By way of example only, upon a source device initiating a communication with a user device, a mobile network receiving such an indication may relay the indication or otherwise provide a cable network with an indication that a communication event is being initiated.

The attribute identifier 212 is configured to identify cable attributes. As previously mentioned, a cable attribute refers to any attribute related to utilization of a cable device. Usage of the cable device may be, for instance, the cable device facilitating display of a television program, display of a movie, display of a video game, etc. By way of example, and not limitation, cable attribute may be a program identifier, a network identifier, a program-type identifier, a source identifier, a time identifier, an activity identifier, a priority-level identifier, or the like. A program identifier identifies a program (e.g., a television cable program) being presented via the cable device. A network identifier identifies a network (e.g., ABC, NBC, etc.) associated with the program being presented via the cable device. A program-type identifier identifies a type of program being presented via the cable device (e.g., a sport program, a live program, a rerun program, a movie program, a news program, etc.). A source identifier identifies a source user or source device initiating the communication event to the user device during usage of the cable device. A time identifier identifies a time (e.g., 8:20 p.m., 20 minutes after the beginning of a television program) a communication event to a user device occurs during usage of the cable device. An activity identifier identifies an indication of program activeness. In this regard, an activity identifier may provide an indication that a program is being actively displayed or, alternatively, an indication that a commercial is being displayed during a program. A priority-level identifier identifies a priority level associated with a program. For instance, programs A, B, and C may have a high priority level, while programs D and E may have a low priority level.

As can be appreciated, the attribute identifier 212 might identify cable attributes based on information provided or determined by a source device, a user device, a mobile network, a cable network, a cable device, another component, or the like. In embodiments, the attribute identifier 212 may identify cable attributes by receiving, requesting, retrieving, or referencing such information from a mobile network, such as the mobile network 118 of FIG. 1. For example, the attribute identifier 212 may reference a source identifier or a time identifier included within an indication of a communication event received from the mobile network or may reference a source identifier or time identifier residing within the mobile network. Alternatively or additionally, the attribute identifier 212 may identify cable attributes by receiving, requesting, retrieving, or referencing such information from a cable device, such as cable device 114 of FIG. 1. For instance, a cable device may provide a program identifier, a network identifier, a program-type identifier, a time identifier, an activity identifier, or the like. Such attributes may also be identified based on information stored or provided within the cable network.

The action determiner 214 is configured to determine one or more communication actions to apply, initiate, or implement in association with a communication event. In embodiments, the action determiner 214 utilizes cable attributes to determine communication actions to apply. Accordingly, one or more communication actions are selected based on cable attributes associated with a communication event. By way of example only, assume that a cable attribute indicates that a particular program or type of program is being presented via a cable device at a time a communication event occurs. Upon identifying such a cable attribute, the action determiner 214 might determine that an audio indicator should be provided to a user via a user device and that a visual indication should be blocked from being displayed via a display screen associated with the user cable device.

In some cases, to determine one or more communications actions to apply, one or more user preferences are referenced. A user preference, as used herein, refers to an indication of a communication action to apply in association with a particular cable attribute(s). A user preference might be provided by a user, for example, via user device 112 of FIG. 1, cable device 114 of FIG. 1, or other computing device. Alternatively, a user preference might be a default preference that is initially established, for example, by a product developer, mobile network service provider, cable network service provider, or the like.

User preferences may be referenced in association with a user of the user device that is to receive a communication from a source device. In this regard, a user identifier may be recognized and, thereafter, used to reference the corresponding user preference(s). For instance, assume the source device 110 of FIG. 1 is placing a voice call to the user device 112 of FIG. 1. In such a case, a user identifier associated with the user device 112 may be identified and, thereafter, used to reference one or more user preferences that correspond with such a user identifier. In embodiments, an index, a lookup system, or an algorithm may be used to identify, reference, or access appropriate user preferences. User preferences may be stored, for example, via a data store associated with a cable network, a mobile network, a user device, a cable device, etc.

As can be appreciated, in some embodiments, a user preference(s) is referenced in cases that the cable device associated with the user is currently functioning or being utilized, for example, by presenting television programming. Accordingly, if a cable device is not being utilized at the time of a communication event, the communication event may proceed (e.g., call or message relayed to the user device) without referencing one or more user preferences. For instance, assume that a cable device associated with a user is not powered on. In such a case, a communication initiated by a source device to a user device can proceed without having to reference one or more user preferences and/or cable attributes.

The action initiator 216 is configured to initiate communication actions. As previously mentioned, a communication action refers to an action performed (or withheld or blocked from being performed) in association with a communication event directed to a user device. Such a communication event may be an incoming voice call (i.e., a telephone call), an incoming text message (e.g., a SMS message), or other incoming communication (e.g., an email, a social network posting, an instant message, etc.). By way of example, a communication action may be presenting an audio indicator of a communication event (e.g., providing a phone ring), withholding an audio indicator of a communication event (e.g., a blocking or preventing a phone ring), presenting a modified-audio indicator (e.g., providing a modified phone ring, for example, applying a vibration rather than a ring tone), presenting a visual indicator of a communication event (e.g., providing a display message), withholding a visual indicator of a communication event (e.g., blocking or preventing a display message), presenting a modified-visual indicator (e.g., providing a modified display message, for example, displaying a smaller version of the display message), monitoring cable device usage (e.g., monitoring a position within a presented program, monitoring the program being presented, monitoring the type of program being presented, etc.).

As a user device, a mobile network, a cable network, a cable device, and/or a display screen may be utilized to implement communication actions, the action initiator 216 may be in communication with such components to initiate appropriate communication actions. By way of example only, assume that presentation or prevention of an audio indicator is selected as a communication action to apply in connection with a communication event. In such a case, the action initiator 216 may communicate with the mobile network and/or the user device to provide a notification to permit or withhold the user device from ringing in response to an incoming voice call. The mobile network and/or user device can then be used to implement presentation or prevention of an audio indicator.

As another example, assume that presentation or prevention of a visual indicator is selected as a communication action to apply in connection with a communication event. In such a case, the action initiator 216 may communicate with the cable network and/or cable device to provide a notification to permit or withhold the cable device or display screen from displaying a visual notification of an incoming voice call or text message. The cable network, cable device, and/or display screen can then be used to present or provide a visual indicator.

Similarly, in cases that monitoring is selected as a communication action to apply in connection with a communication event, the action initiator 216 may communicate with the cable network and/or cable device to provide a notification to monitor, for example, cable device usage, the program being presented, the type of program being presented, etc. The cable network and/or the cable device can then be used to monitor appropriate cable attributes. In instances that a modified cable attribute is detected that corresponds with a user preference, the action initiator 216 can initiate a communication action in accordance with the modified cable attribute. For instance, assume that when monitoring a television program presented via a cable device a commercial is presented, a user switched to viewing a lower priority program, or the like. Upon detecting such a modification of a cable attribute, a communication action that corresponds with the modified cable attribute is initiated. In this regard, returning the voice call, presentation of a voice message or text message or an indication thereof, etc. can be initiated.

Figure 3:
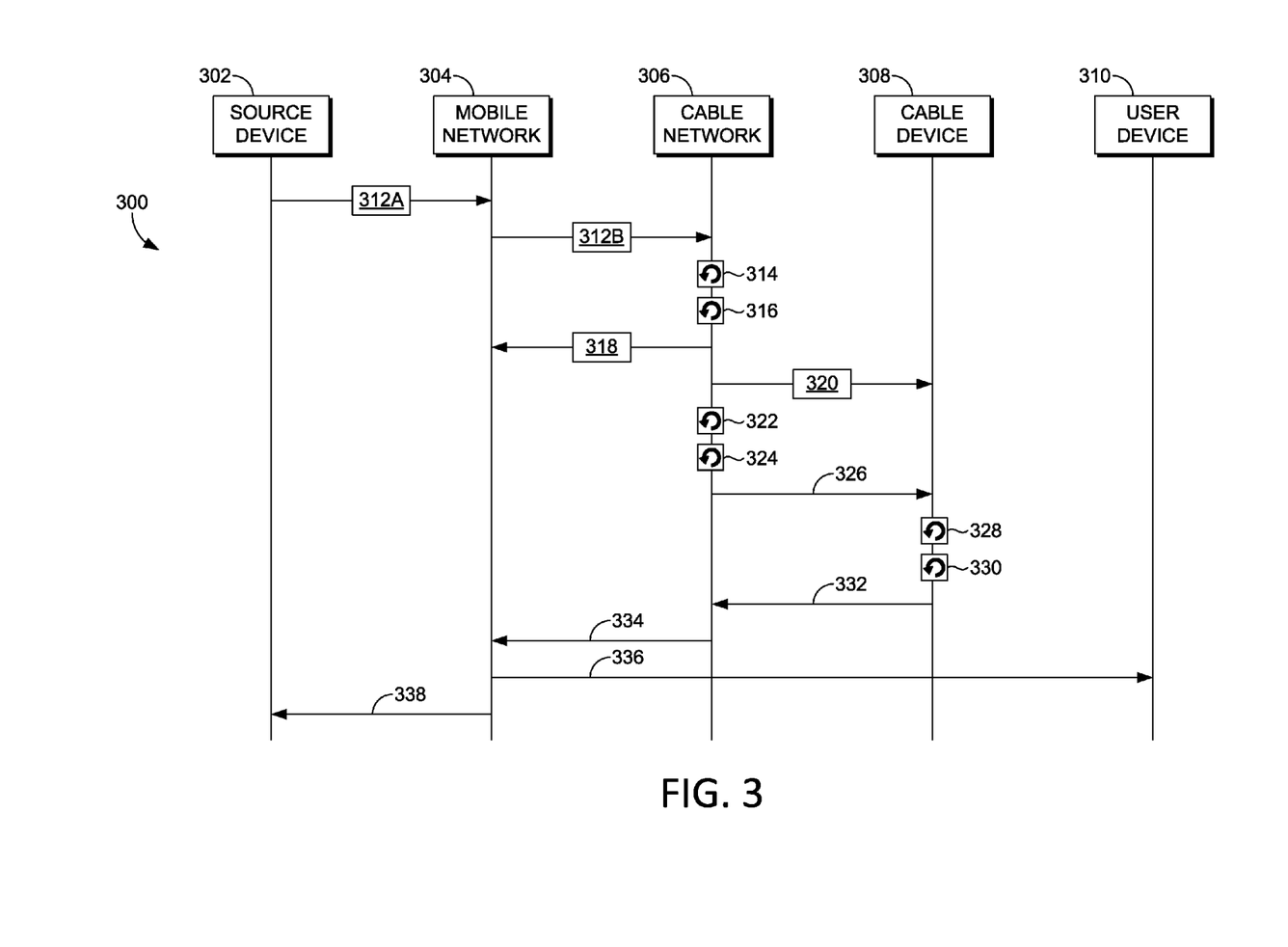
FIG. 3 depicts a flow diagram for facilitating communication actions in accordance with cable attributes, in accordance with an embodiment of the present invention.

By way of example only, and with reference to FIG. 3, an exemplary flow diagram illustrating a method for facilitating communication actions in accordance with cable attributes is generally depicted by numeral 300. The flow diagram includes a source device, generally depicted by numeral 302; a mobile network, generally depicted by numeral 304; a cable network, generally depicted by numeral 306; a cable device, generally depicted by numeral 308; and a user device, generally depicted by numeral 310. The networks, devices, and components depicted within flow diagram 300 are comparable to the networks, devices, and components of similar name previously discussed with reference to FIG. 1.

Initially, the source device 302 initiates a voice call 312A directed to the user device 310. The mobile network 304 receives an indication of the voice call 312A. Upon receipt of the indication of the voice call 312A, the mobile network 304 communicates an indication of the voice call 312B to the cable network 306. Such an indication may also include, for example, a request to identify cable attributes associated with usage of the cable device 308.

At block 314, the cable network 306, or a portion thereof, identifies one or more cable attributes that are associated with utilization of the cable device 308. In embodiments, particular cable attributes are identified, such as, a television program, or a priority level thereof, being displayed via the user device 310. Based on the cable attributes, the cable network 306 identifies one or more communication actions, as indicated at block 316. Upon identifying one or more communication actions to apply, the cable network 306 can initiate implementation of such selected communication actions. For instance, in cases that it is determined to ring or not ring the user device 310 in response to the incoming voice call, the cable network 306 may communicate a ring indicator 318 to the mobile network 304 to indicate whether the user device 310 should ring to notify the user of the incoming call. In cases that it is determined to display or not display a visual indication of the incoming voice call, the cable network 306 may communicate a visual indicator 320 to the cable device 308 to indicate whether the cable device should display a visual indicator. In some cases, the cable network 306 may monitor cable attributes associated with cable device usage, as indicated at block 322. For example, a program being viewed or progress of the program may be monitored. Assume that, at block 324, a modified cable attribute is detected that corresponds with a communication action. In such a case, the cable network 306 can initiate the appropriate communication action(s) that corresponds with the modified cable attribute. For instance, the cable network 306 may communicate 326 with the cable device 308 to allow the user to check voicemail or return the call. In this regard, upon receiving the communication 326 from the cable network 306, the cable device 308 might facilitate display 328 of an option to a user to check voicemail or return the voice call. If the cable device 308 receives 330 an indication from a user to check voicemail or return the voice call (e.g., via a remote control button), the cable device 308 communicates 332 such an indication to the cable network 306. The cable network 306 can then communicate 334 with the mobile network 304 to establish a connection 336 with the user device 310 and/or a connection 338 with the source device 302.

Figure 4:
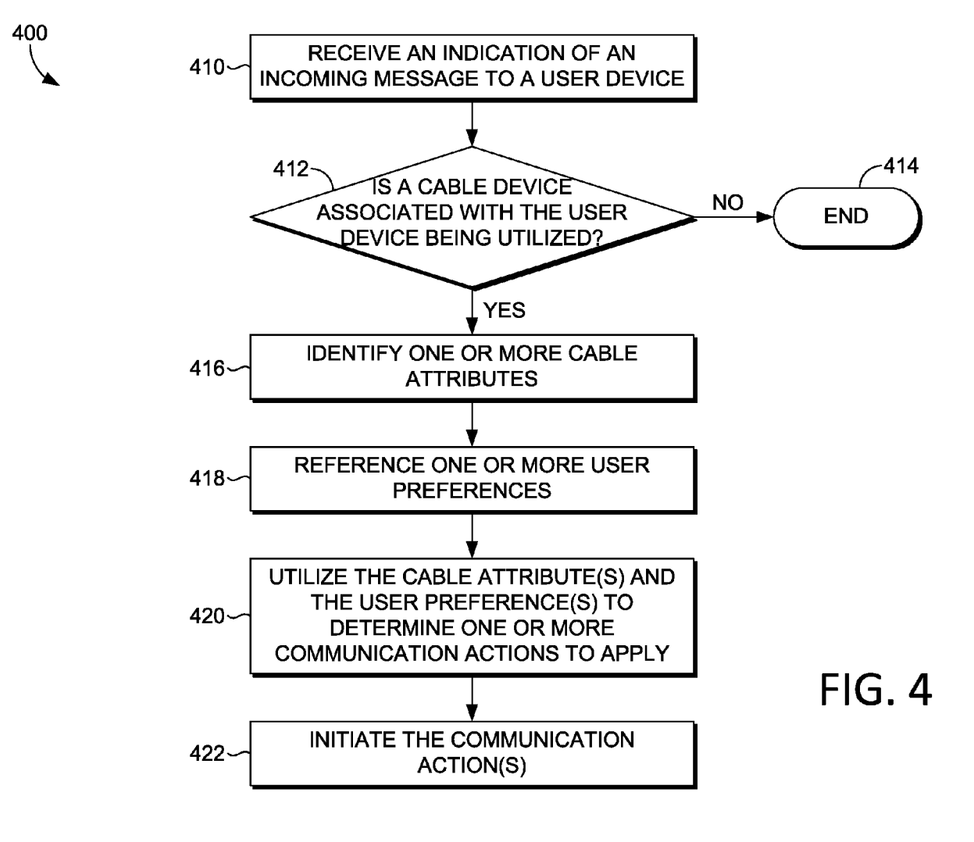
FIG. 4 illustrates a first method, according to an embodiment of the present invention, for facilitating communication actions in accordance with cable attributes.

Referring now to FIG. 4, an exemplary method 400 for facilitating communication actions in accordance with cable attributes is provided. Initially, as indicated at block 410, an indication of a communication event incoming to a user device is received. Such a communication event may be, for example, a voice call, a text message, an instant message, an electronic message, a social network message, etc. At block 412, it is determined whether a cable device associated with the user device is being utilized. If it is determined that an associated cable device is not being currently utilized (e.g., presenting television programming), the method ends at block 414. Accordingly, the communication event can proceed as typical. If, on the other hand, it is determined that an associated cable device is being currently utilized, at block 416, one or more cable attributes are identified. Such cable attributes can be any attribute related to utilization of the cable device, such as, for instance, a program identifier, a network identifier, a program-type identifier, a source identifier, a time identifier, etc. In embodiments, cable attributes can be identified using, for example, a user device, a cable device, a mobile network, a cable network, and/or the like.

At block 418, one or more user preferences are referenced. User preferences may indicate a communication action to apply in connection with a particular cable attribute or set of cable attributes. Such user preference can be referenced via a data store containing user preferences for various users. At block 420, the cable attribute(s) and the user preference(s) can be used to determine one or more communication actions to apply. In this regard, the cable attribute(s) and the user preference(s) can be utilized to determine whether to provide a visual indication of the communication event to the user via the cable device, whether to provide an audible indication of the communication event to the user via the user device, whether to monitor the usage of the cable device (e.g., which program is being presented, whether a commercial is being presented, etc.), a combination thereof, or the like. At block 422, the communication action(s) is initiated such that the user is appropriately notified or not notified of the communication event.

Figure 5:
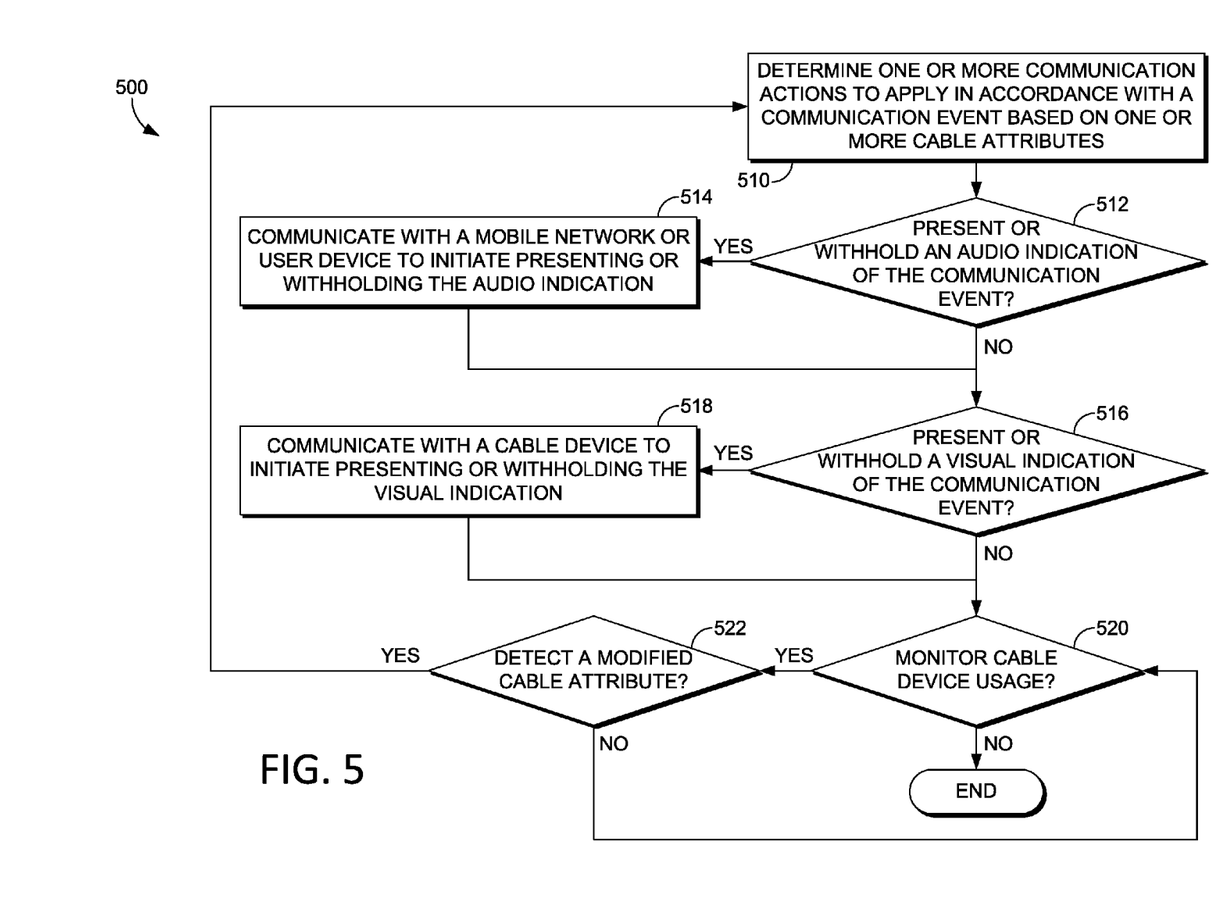
FIG. 5 illustrates a second method for facilitating communication actions in accordance with cable attributes, in accordance with an embodiment of the present invention.

With reference to FIG. 5, in accordance with an embodiment of the present invention, an exemplary method 500 for facilitating communication actions in accordance with cable attributes is illustrated. Initially, as indicated at block 510, one or more communication actions to apply in accordance with a communication event are determined based on one or more cable attributes. At block 512, it is determined if an audio indication of the communication event should be presented or withheld based on the identified communication actions to apply. If so, presenting or withholding the audio indication is initiated by communication with a mobile network or user device. For example, the mobile network and/or user device may be provided with an indication to ring the user device. On the other hand, if it is determined that an audio indication is not a communication action to apply in accordance with the communication event, it is determined, at block 516, if a visual indication of the communication event should be presented or withheld based on the identified communication actions to apply. If so, presenting or withholding the visual indication is initiated by communication with a cable device. For instance, the cable device may be provided with an indication to display a notification of the communication event to the user.

On the other hand, if it is determined that a visual indication is not a communication action to apply in accordance with the communication event, it is determined at block 520 if cable device usage should be monitored. For instance, monitoring may include recognizing the television program being presented, whether a commercial is being presented, etc. If cable device usage is not to be monitored, the method ends at block 522. If, however, cable device usage is to be monitored, at block 524, it is determined if a modified cable attribute is detected. In this way, it can be determined if a televised program is switched by a user, ends, breaks for a commercial, etc. If a modified cable attribute is detected, the method returns to block 510 to determine a communication action(s) to apply based on the modified cable attribute. Depending on the modified cable attribute, communication actions to apply may be, for example, an audio indication of the previous communication event, a visual indication of the previous communication event, etc. The visual indication may provide an indication that the previous communication event occurred and/or present an option to return the communication event (e.g., voice call). A user may then select to return the communication event, for example, by using a remote control or other device to select such an option.

It will be understood by those of ordinary skill in the art that the order of steps shown in the method 400 of FIG. 4 and method 500 of FIG. 5 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for facilitating communication actions in accordance with cable attributes, the system comprising:
   a communication indication receiver configured to receive an indication of an incoming communication directed to a separate user device;
   an attribute identifier configured to reference one or more cable attributes including an activity identifier that indicates that a television program is being actively displayed on a display associated with a cable device at the time of receipt of the indication of the incoming communication, the referencing performed without interruption of the actively displayed television program;
   an action determiner configured to determine one or more communication actions to initiate based on the one or more cable attributes including the activity identifier, wherein the one or more communication actions include presentation of a notification of the incoming communication or postponing presentation of a notification of the incoming communication; and
   an action initiator configured to initiate the one or more communication actions determined.

2. The system of claim 1, wherein the system is communicatively coupled to one or more of the user device, the cable device, a cable network, a local wireless network, a high-speed fiber-optic network, or a telecommunications network.

3. The system of claim 1, wherein the notification of the incoming communication includes one or more of a visual indicator or audio indicator to be presented via one or more of the cable device or the user device.

4. The system of claim 1, wherein the incoming communication is sent by a source device, the source device including a remote mobile device of another user.

5. The system of claim 1, wherein the incoming communication is a voice call or a text message to be delivered to the user device.

6. The system of claim 1, wherein when it is determined that the one or more communication actions to initiate include postponing presentation of a notification of the incoming communication, the action determiner is further configured to monitor the television program displayed on a display associated with the cable device.

7. The system of claim 6, wherein upon a change of the television program displayed, the action initiator is further configured to initiate the one or more communication actions including presentation of a notification of the incoming communication.

8. The system of claim 1, wherein the one or more cable attributes further includes a network identifier that identifies a television network associated with the television program displayed.

9. The system of claim 1, wherein the one or more cable attributes further includes a priority-level identifier that identifies a priority level associated with the television program that is being actively displayed.

10. The system of claim 1, wherein at least one of the one or more cable attributes is provided to the attribute identifier by the cable device or cable network.

11. The system of claim 1, wherein the attribute identifier is further configured to request the one or more cable attributes or retrieve the one or more cable attributes from one or more of a mobile network or a cable network.

12. A computer-implemented method for determining the issue of a communication event during utilization of a cable device:
   receiving an indication of an incoming communication event to be delivered to a user device via a telecommunications network;
   referencing one or more cable attributes of the cable device including an activity identifier, wherein the activity identifier provides an indication that a program is being actively displayed or an indication that a commercial is being actively displayed;
   selecting one or more communication actions to apply regarding the incoming communication event to be delivered to the user device, the one or more communication actions selected based on the one or more cable attributes referenced; and
   communicating an indication of the one or more communication actions selected to the cable device or the user device for performance thereon.

13. The method of claim 12, wherein at least one of the one or more cable attributes comprises a network identifier, the network identifier identifying a network associated with a program being presented via the cable device.

14. The method of claim 12, wherein at least one of the one or more cable attributes comprises a source identifier, the source identifier identifying a user or device initiating the incoming communication event to be delivered to the user device.

15. The method of claim 12, further comprising referencing one or more user preferences for the one or more cable attributes referenced, the one or more user preferences indicating a preferred communication action to be selected based on the one or more cable attributes.

16. The method of claim 15, wherein the one or more user preferences include a default preference indicating a default communication action or an initial communication action.

17. The method of claim 12, wherein the activity identifier provides an indication that a program is being actively displayed and further indicates the program is a television program, a movie, or a video game.

18. The method of claim 12, wherein the one or more communication actions include presentation of a notification of the incoming communication, postponing presentation of a notification of the incoming communication, blocking a notification of the incoming communication, or monitoring the one or more cable attributes including the activity identifier.

* * * * *